United States Patent [19]

Kawasaki

[11] Patent Number: 4,899,675

[45] Date of Patent: Feb. 13, 1990

[54] SEWING APPARATUS FOR SEWING A CURVED, WAVY CLOTH

[75] Inventor: Kiyoshi Kawasaki, Akishima, Japan

[73] Assignee: Tachi-S Co., Ltd., Tokyo, Japan

[21] Appl. No.: 330,572

[22] Filed: Mar. 29, 1989

[30] Foreign Application Priority Data

May 31, 1988 [JP] Japan .................................. 63-134073
May 31, 1988 [JP] Japan .................................. 63-134074

[51] Int. Cl.[4] ........................ D05B 21/00; D05B 27/00
[52] U.S. Cl. ................................ 112/121.12; 112/308; 112/153; 112/121.15
[58] Field of Search ....................... 112/121.12, 121.11, 112/121.15, 308, 309, 153

[56] References Cited

U.S. PATENT DOCUMENTS

| | | | |
|---|---|---|---|
| 3,815,530 | 6/1974 | Denton | 112/309 |
| 4,286,531 | 9/1981 | Molloy | 112/121.15 |
| 4,297,955 | 11/1981 | Shaw | 112/121.15 |
| 4,590,877 | 5/1986 | Schwarzberger | 112/121.11 X |
| 4,776,579 | 10/1988 | Romand et al. | 112/308 X |

Primary Examiner—H. Hampton Hunter
Attorney, Agent, or Firm—Browdy & Neimark

[57] ABSTRACT

A sewing apparatus which permits the automatic sewing of a base blank material in a sinuous or wavy fashion. The apparatus includes a sewing machine body, a stationary plate fixed on the table of the sewing machine body, the stationary plate having three guide grooves formed thereon, and a movable plate having three guide rollers provided thereunder, the movable plate receiving the base blank material thereon. The guide rollers are slidably fitted in the respective guide grooves so that the movable plate is moved in a manner guiding the blank material for sewing by the sewing machine body in a sinuous or wavy fashion.

7 Claims, 4 Drawing Sheets

SEWING APPARATUS FOR SEWING A CURVED, WAVY CLOTH

The present invention is related to co-pending application in the name of Kiyoshi Kawasaki entitled "Sewing Apparatus For Automatically Sewing A Cloth Having A Rectilinear Shape To A Cloth Having A Curved Shape" filed on even date herewith. The specification of this co-pending application is hereby incorporated by reference.

BACKGROUND OF THE INVENTION

1. Field of the Invention

The present invention relates to a sewing apparatus so designed to effect sewing in a curved or sinuous fashion.

2. Description of the Prior Art

In the past, and in general, sewing one cloth to another one in a curved or sinuous fashion has not, in practice, been accomplished by automatic means because of technical difficulties remaining in such an intricate sewing process. In most cases, an operator has to manually manipulate the separately cut base cloths for curved or sinuous sewing purposes, using a conventional sewing machine. Therefore, an accumulation of skill or expertise has been required to achieve this sewing technique, resulting in obstacles to high efficient and rapid sewing processes of the type required to keep abreast with the recent automation-oriented tendency.

The inventor of the present invention previously proposed providing a sewing apparatus to realize the automatization of sewing a curved seam. According to this first invention, a stationary plate is fixed on the table of a sewing machine and a movable plate is slidably mounted on the stationary plate. The stationary plate has a guide means projected thereon and a curved, or sinuous, elongated groove formed thereon. On the other hand, the movable plate is formed with a peripheral edge which conforms to a given curved sewing path along which a cloth or base material is sewn from the start point through a generally 90-degree-angle curvature to the end point. This movable plate has a curved guide hole similar in shape to the foregoing sewing path and a dependent guide means projected from the underside of the movable plate. The sinuous elongated groove of the stationary plate is of a configuration corresponding to a track in which the movable plate has to be moved for allowing the cloth or base material to be sewn in such curvature. The guide means of the stationary plate is slidably inserted through the curved guide hole of the movable plate, and the guide means of the movable plate is slidably fitted in the sinuous elongated groove of the stationary plate.

Accordingly, the cloth secured on the movable plate is sewn in a curved manner from the combination of the curved guide hole of the movable plate and sinuous elongated groove of the stationary plate, by virtue of the fact that the curved guide hole serves to guide the movable plate along this generally 90-degree curvature and the sinuous elongated groove serves to cause the movable plate to move along the curved guide hole. Hence, the cloth is automatically sewn in a predetermined curved manner.

But, the above-described first invention has been limited to curved sewing, and sewing to provide a generally sine-shaped or ⌒-like sewing pattern has not been made possible with that prior art. The reason is that the two guide means respectively associated with the stationary and movable plates are moved in a mutually co-acting relation for the sole purpose of sewing the cloth in a generally 90-degree-angle curvature. No effective automatic sewing apparatus has yet been proposed for automatically sewing sine-shaped sewing patterns.

SUMMARY OF THE INVENTION

It is therefore an object of the present invention to provide a novel sewing apparatus which is capable of effecting sewing in a sinuous fashion automatically.

In accomplishment of such purpose, the present invention comprises a stationary plate fixed on the table of a sewing machine body and a movable plate slidably mounted on the stationary plate, the movable plate being so designed that a cloth to be sewn is secured thereon by means of clamps, and at the bottom of the movable plate, first, second and third guide rollers are provided rotatably in a mutually spaced-apart relation. The stationary plate is, at its upper surface, formed with first, second and third guide grooves, each of those three guide grooves receiving the first, second and third guide rollers, respectively, in a manner allowing the slidable movements of the three guide rollers along the three guide grooves. Each configuration of the three guide grooves is formed in a meandering shape conforming to a proper trace which is to be shown for permitting the movable plate to move along a desired sinuous sewing path. Further, the guide grooves are so arranged that two of them are each formed with a widened groove, while on the other hand, one of them is not so formed. In this way, an escape or play zone is given for one of the three guide rollers to be placed in an idle state, thereby allowing smooth movements of other two guide rollers along their respective acutely curved portions of guide grooves.

Accordingly, when the sewing apparatus is actuated for starting the sewing operation, the cloth secured on the movable plate is sewn by the apparatus and caused to move in a sewing direction, which in turn causes the sinuous movement of the movable plate relative to the stationary plate, with the three guide rollers of the former being slidingly moved along the respective guide grooves of the latter.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DETAILED DESCRIPTION OF THE PREFERRED EMBODIMENTS

Figure 1A:
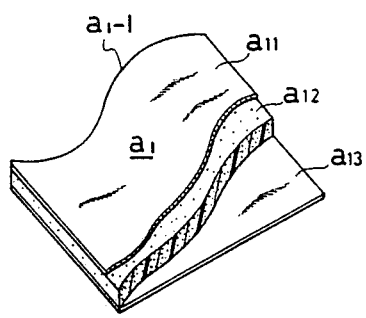
FIG. 1A is a partially broken perspective view of a base blank material which is to be sewn by a sewing apparatus in accordance with the present invention.

Referring first to FIG. 1A, a three-layer base blank material a1 is shown having a sinuously-cut or wavy edge a1-1, having a concave-convex contour, having a "⌒⌒" shape like a sine wave. The base blank material a1 comprises a top cover layer, a11, preferably made of a woven fabric or synthetic resin leather, an intermediate pad layer, a12, preferably made of urethane foam and a back layer, a13, preferably made of a nonwoven cloth.

Figure 1B:
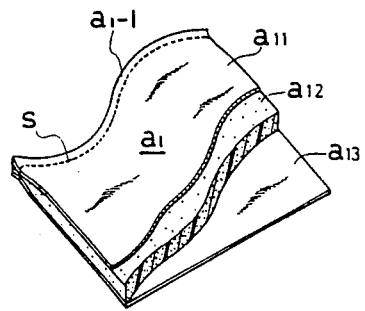
FIG. 1B is a partially broken perspective view of the base blank material which has been sewn by the same sewing apparatus.

FIG. 1B shows the base blank material a1 with a seam s appearing adjacent and along the wavy edge a1-1 thereof. Namely, in this figure, the edge a1-1 is sewn with yarn for preventing fraying which might occur there.

Figure 2:
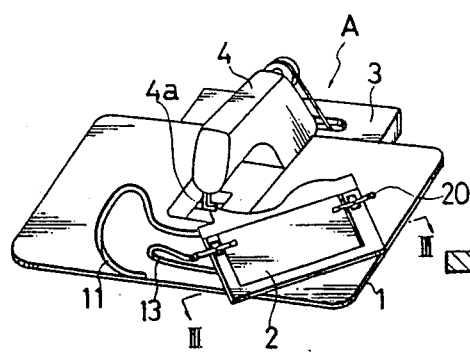
FIG. 2 is a perspective view of the present invention.
Figure 3:
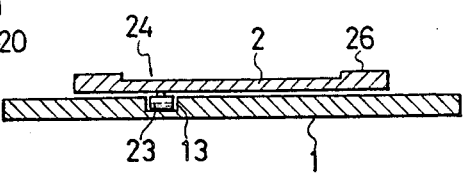
FIG. 3 is a sectional view taken along the line III—III in FIG. 2.

Referring now to FIG. 2, the sewing apparatus A in accordance with the present invention is shown, which is so designed to sew the foregoing wavy edge a1-1 of the base blank material a1.

A stationary plate 1 is fixed on a table 3 of the sewing apparatus A, and a movable plate 2 is provided on which is mounted the above-stated first base blank material a1' by means of two clamps 20, 20.

Figure 4:
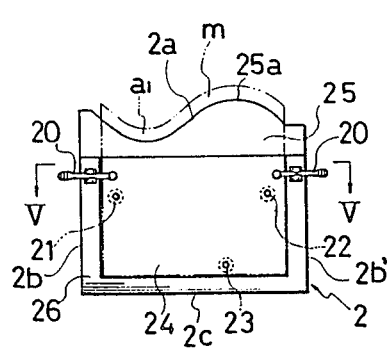
FIG. 4 is a plan view of the movable plate according to the present invention.

As shown in FIG. 4, the movable plate 2 is superposed on the stationary plate 1, and is defined by a sewing operative side 2a adjacent to the sewing machine body 4, a pair of lateral sides 2b, 2b', and a free base side 2c opposite to the sewing operative side 2a.

On the stationary plate 1, a first guide groove 11, a second guide groove 12 and a third guide groove 13 are formed (FIG. 6), and on the reverse or bottom surface of the movable plate 2, a first guide roller 21, a second guide roller 22 and a third guide roller 23 are rotatably provided (FIG. 4) in such a manner that the first, second and third guide rollers 21, 22, 23 are fitted in the first, second and third guide grooves 11, 12, 13, respectively, in a rollable way, as can be understood from FIGS. 3, 4, 5, 6 and 7. A pressing retainer 4b of the sewing apparatus A is adapted to pressingly retain the blank materials a1 for sewing them in the sewing area 4a.

Figure 5:
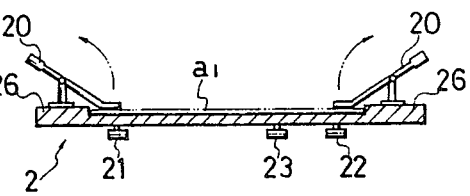
FIG. 5 is a sectional view taken along the line V—V in FIG. 4.

Referring to FIGS. 4 and 5, the movable plate 2 comprises a sewing guide plate 25 provided at its sewing operative side 2a. The sewing guide plate 25 extends outwardly from side 2a and includes a concave-convex wavy edge 25a which conforms in shape to the wavy edge a1-1 of the base blank material 1a, a peripheral thickened rim 26 formed along both lateral sides 2b, 2b' and free base sides 2c of the movable plate 2, a pair of the opposingly disposed clamps 20, 20 each being provided on the respective lateral sides 2b, 2b', a recessed area 24 which is defined centrally of the movable plate 2 by virtue of the thickened portion 26 being raised circumferentially of the movable plate 2, and the first, second and third guide rollers 21, 22, 23 rotatably provided on the reverse surface of the movable plate 2 such that they are dependent therefrom. The concave-convex wavy edge 25a is preferably made of stainless steel or a like material.

The arrangement of these guide rollers 21, 22, 23 is such that, as readily understandable from FIG. 4, they are disposed spaced apart from one another in a sense to establish a triangularly positioned relationship with one another, with the first and second rollers 21, 22 being disposed adjacent to the respective lateral sides 2b, 2b' of the movable plate 2 and the second roller 23 being disposed adjacent to the free base side 2c of the movable plate 2.

Figure 6:
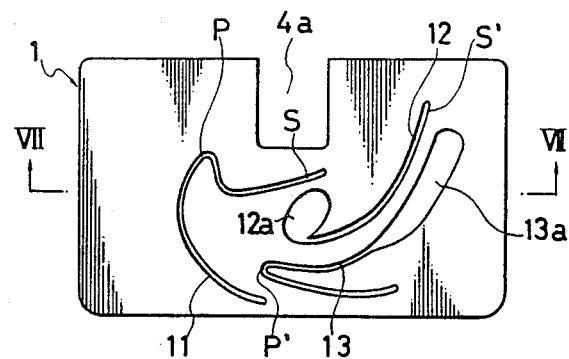
FIG. 6 is a plan view of the stationary plate according to the present invention.
Figure 7:
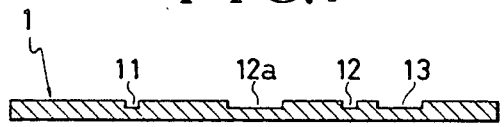
FIG. 7 is a sectional view taken along the line VII—VII in FIG. 6.

Referring to FIGS. 6 and 7, specifically shown are the foregoing first, second and third guide grooves 11, 12, 13 formed on the upper surface of the stationary plate 1. Those three grooves are formed in conformity with the respective movement tracks of the first, second and third guide rollers 21, 22, 23, the arrangement of those tracks being determined in order for the movable plate 2 to carry out proper movement (as can be seen from FIG. 10) for subjecting the wavy edge a1-1 of the base blank material a1 to being sewn in a predetermined sinuous wavy fashion, like a "⌒⌒" shape, which will be explained later in more detail.

Briefly, the first guide groove 11 is formed in a generally dog-leg shape at the left side, the third guide groove 13 is formed in a generally L-shaped configuration at the right side, and the second guide groove 12 is formed in a generally bow shape between the first and third guide grooves 11, 13, as viewed from FIG. 5. At one end of the second guide groove 12, there is formed a generally circular widened groove 12a, and likewise, at one end portion of the third guide groove 13, an elongated, widened groove 13a is formed. Both circular and elongated widened grooves 12a, 13a are of a greater area than the outer diameters respectively of the second guide roller 23 and third guide roller 22.

The circular widened groove 12 is intended to let the second guide roller 23 remain idle or move freely therein, in the case where (i) the first and third guide rollers 21, 22, both being, of course, fitted in the respective first and third guide grooves 11, 13, pass through such arcuately curved portions as indicated at P and P' defined respectively in the first and third guide grooves 11, 13, or (ii) the first guide roller 21 is turned in a direction opposite to or different from the direction in which the third guide roller 23 is moved. In this way, the second guide roller 22 does not interfere with the coactive movements of the first and third rollers 21, 22.

The elongated widened groove 13a is intended to let the third guide roller 22 remain idle or move freely therein during the initial stage wherein the movable plate 2 starts to be moved; namely, when the first and second guide rollers 21, 23 are moved along the respective initial curved points S, S' of the first and second guide grooves 11, 12. Accordingly, the third guide roller 22 does not interfere with the initial coactive movements of the first and second guide rollers 21, 23.

Figure 8:
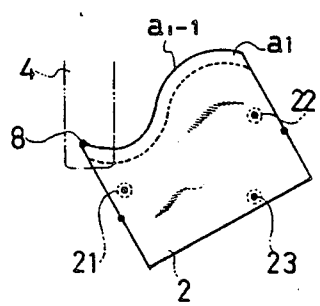
FIG. 8 is a plan view of a first base blank material, showing its initial position for sewing.

FIG. 8 shows the initial condition or position of the movable plate 2. Hence, from the shown position, the movable plate 2 starts to be moved, allowing sewing of the wavy edge a1-1 of the base blank material a1.

Figure 9:
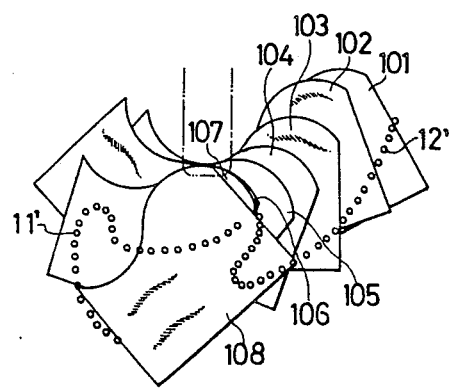
FIG. 9 is a schematic view showing the movements of the movable plate during sewing operation.
Figure 10A:
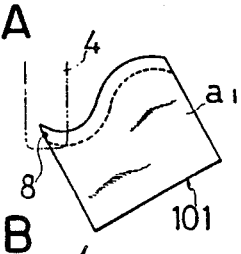
FIGS. 10(1) through 10(8) are sketch views which roughly show a series of movements of the movable plate as well as a series of sewing processes.
Figure 10B:
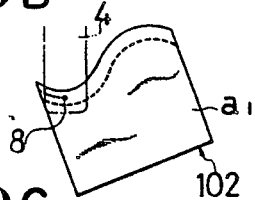
Figure 10C:
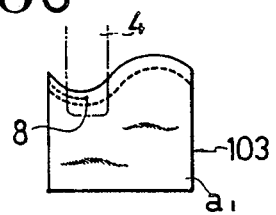
Figure 10D:
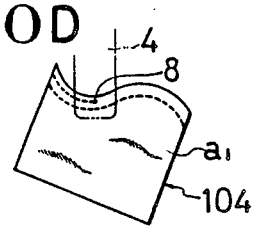
Figure 10E:
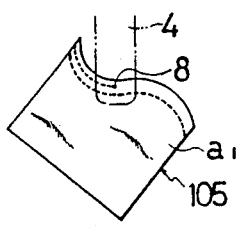
Figure 10F:
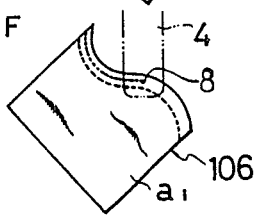
Figure 10G:
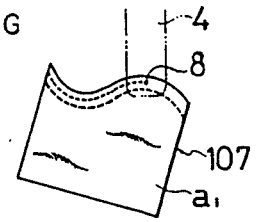
Figure 10H:
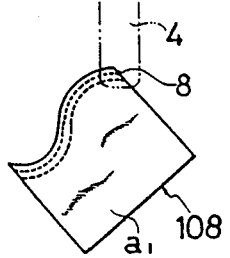

FIG. 9 schematically shows the continuous flow of movements of the movable plate 2 when the sewing operation is being effected. From this figure, it is seen that the sliding movement of the first, second and third guide rollers 21, 22, 23 along the respective guide grooves 11, 12, 12a, 13, 13a causes the shown series of movements of the movable plate 2. In this particular figure, the movable plate 2 is caused to move in the following order: first, at the initial point designated by 101, and thereafter, through the subsequent points 102, 103, 104, 105, 106, 107 in the arrow direction, down to the terminal point 108. Reference numerals 11', 12', 13' denote the traces which are shown respectively by the first, second and third guide rollers 21, 22, 23 during such series of movements of the movable plate 2.

FIGS. 10(1) through 10(8) shows the individual positions of the movable plate 2 from the initial point 101 to the terminal points 108 as shown in FIG. 9. Thus, the segmental diagrams 101, 102, 103, 104, 105, 106, 107 and 108 associated with the movable plate 2, as shown in FIG. 9, correspond respectively to the sketch diagrams 101 in FIG. 10(1), 102 in FIG. 10(2), 103 in FIG. 10(3), 104 in FIG. 10(4), 105 in FIG. 10(5), 106 in FIG. 10(6), 107 in FIG. 10(7) and 108 in FIG. 10(8). From those figures, the positional state of the movable plate 2 relative to the needle 8 of the sewing machine body 4 can be observed, and also understandable, by the dotted line, is the way in which the wavy edge a1-1 of the base blank material a1 is sewn by the needle 6.

Figure 11:
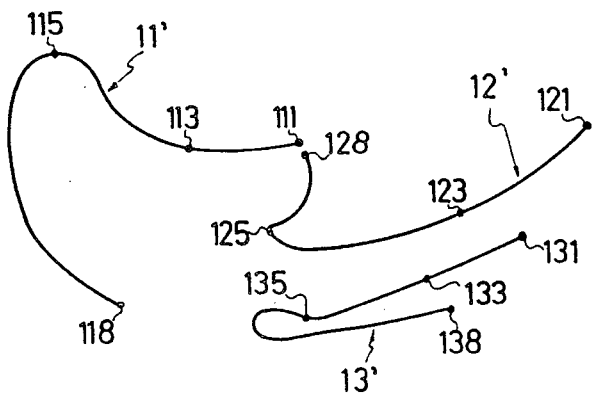
FIG. 11 is a rough schematic view of the traces respectively of first, second and third guide rollers of the movable plate.

Referring to FIG. 11, the movement traces which are respectively drawn by the above-stated first, second and third guide rollers 21, 22, 23 in the course of their movements along their corresponding guide grooves 11, 12, 13 are shown in solid lines. The numerals 11', 12' and 13' refer to the first trace shown by the first guide roller 21, the second trace shown by the second guide roller 22, and the third trace shown by the third guide roller 23, respectively.

In this context, comparison between FIG. 11 and FIG. 10 leads to the understanding of the positional relation between those three traces 11', 12', 13' and the movable plate 20. Namely, the numerals 111, 121, 131 in FIG. 11, which represent the respective initial positions of the first, second and third guide rollers 21, 22, 23 in their respective traces 11', 12', 13', indicate the initial point of the movable plate 20 shown in FIG. 10(1), the subsequent second set of numerals 113, 123, 133 and third set of numerals 115, 125, 135 in FIG. 11, which are of course associated with the three guide rollers 21, 22, 23, respectively, indicate the second point of the movable plate 20 in FIG. 10(3) and the third point of the same plate 20 in FIG. 10(5), and the last fourth set of numerals 118, 128, 138, which represent the respective terminal positions of the three guide rollers 21, 22, 23, indicate the terminal point of the movable plate 20.

Figure 12A:
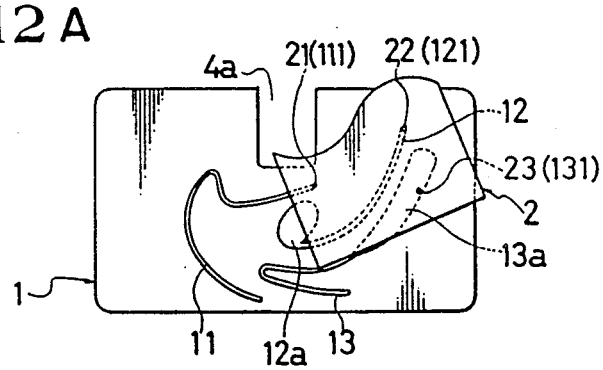
FIG. 12(I) through 12(IV) are views which explanatorily show the movement of the three guide rollers along their respective guide grooves as well as the attendant movements of the movable plate.
Figure 12B:
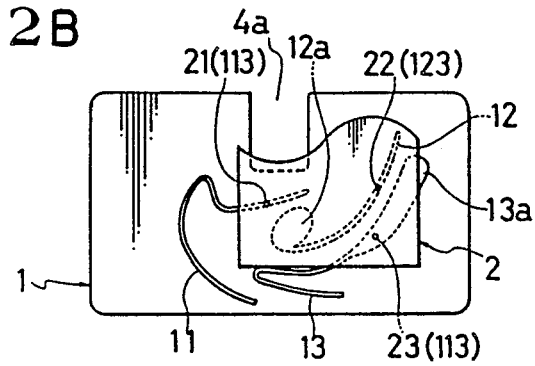
Figure 12C:
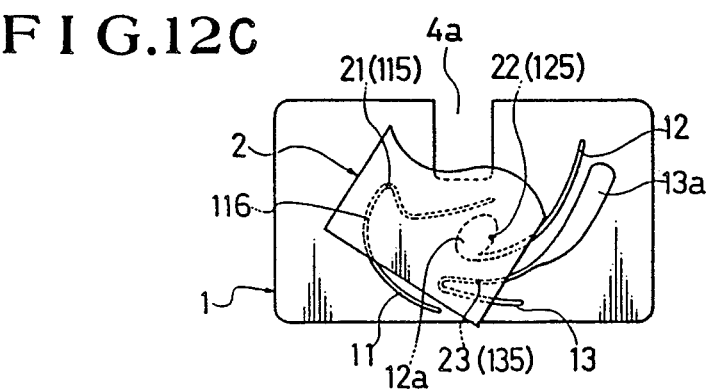
Figure 12D:
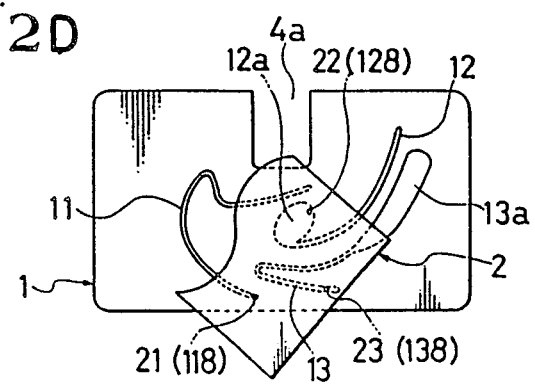

FIGS. 12(I) through 12(IV) show the movements of the movable plate 2 relative to the stationary plate 1. FIG. 12(I) shows the initial state where the movable plate 2 is located at the starting point, with its first, second and third guide rollers 21, 22, 23 being respectively located at the initial ends of the first, second and elongated widened grooves 11, 12, 13a formed on the stationary plate 2. This initial state corresponds to FIG. 10(1) and the numerals 111, 121, 131 in FIG. 11. Subsequent thereto, the second state in FIG. 12(II) corresponds to FIG. 10(3) and the numerals 113, 123, 133 in FIG. 11, the third state in FIG. 12(III) corresponds to FIG. 10(5) and the numerals 115, 125, 135 in FIG. 11, and the fourth state in FIG. 12(IV) corresponds to FIG. 10(8) and the numerals 118, 128, 138.

Thus, the comparative viewing of the FIGS. 9 to 11 and 12(I) to 12(IV) provides a general understanding of basic movement of the movable plate 2 relative to the stationary plate 1.

Now, a description will be made of the operation of the above-described sewing apparatus A.

At first, the base blank material a1 is placed on the recessed area 24 of the movable plate 20 secured thereon by means of clamps 20. Care is taken to ensure that the sewing margin at m in FIG. 4 of the blank material a1 projects a proper distance from the outer edge 25a of the sewing guide plate 25, to thereby be placed in an initial position ready for sewing, as shown in FIG. 8.

Then, the turning on of the sewing apparatus A to start sewing the blank material a1 causes the vertical reciprocal movements of the needle 8 and feeding action by way of the pressing retainer 4b and feeding member (not shown). This in turn draws the blank material a1 towards the sewing area 4a and simultaneously causes the movement of the movable plate 2 along the foregoing three guide grooves 11, 12, 13 by reason of the fact that the blank material a1 is secured firmly on the movable plate 2.

As shown in FIG. 10(1) and 10(2), the wavy edge a1-1 of the base blank material a1 is sewn, while being guided by the corresponding wavy edge 25a of the sewing guide plate 25 of the movable plate 2.

Thus, the first, second and third guide rollers 21, 22, 23 are moved from their respective initial points shown in FIG. 12(I) and slidingly travel down along the respective guide grooves 11, 12 and elongated widened groove 13a. At this time, it is to be noted that the first and second guide rollers 21, 22 are actually moved along the respective first and second guide grooves 11, 12, while by contrast, the third guide roller 23 is being left idle or moved freely within the widened groove 13a, whereby the movement of the movable plate 2 is smoothly effected without interruption caused by the hindrance of the third guide roller 23 against the coactive movements of the first and second rollers 21, 22.

When the sewing proceeds to the point at the bottom of valley v in both wavy edges of the blank material a1 and movable plate 2, as in FIG. 10(3), then, the first, second and third guide rollers 21, 22, 23 under the movable plate 2 are brought at the respective points 113, 123, 133 in the first, second and widened grooves 11, 12, 13a as is understandable from FIGS. 11 and 12(II).

Then, the sewing reaches the midway point c in both wavy edges of the blank material a1 and movable plate 2, as in FIG. 105, the first and second guide rollers 21, 22 are released from their co-active movement relationship, as the second guide roller 22 enters the generally circular widened groove 12a, thus being left idle therein. Then, the third guide roller 23 is slidingly moved along the third guide groove 13 into a co-active movement in relationship with the first guide roller 21, so as to orient the sewing procedure towards the hill half portion h of the wavy edge a1-1 of the blank material a1. At this stage, the first, second and third rollers 21, 22, 23 are therefore positioned at their respective points 115, 125, 135, as can be observed from FIGS. 11 and 12(11I).

From the midway point c up to the terminal point shown in FIG. 10(8), as the sewing proceeds, the movable plate 2 shows such movements as roughly sketched in FIGS. 10(6) to 10(8). Thus, the remaining half of the Wavy edge a1-1 of the material a1 is sewn. During this portion of the operation, the first and third guide rollers 21, 23 are moved along their guide grooves 11, 13 while the second roller 22 is left idle, causing no interference with the co-active movements of the former two rollers 21, 23.

When the sewing reaches the terminal point as in FIG. 10(8), the movable plate 2 is prevented from further movement, since the first and third guide rollers 21, 23 reach their respective terminal points 118, 138, and the second guide roller 22 reaches the upper edge of the circular widened groove 12a, as seen in FIGS. 11 and 12(IV). Thus, the sewing of the wavy edge a1-1 of the blank material a1 is completed.

The present invention is not limited to the illustrated embodiment, but, for example, the above-stated three guide rollers 21, 22, 23 and guide grooves 11, 12, 13 may be provided on the stationary plate 1 and movable plate 2, respectively, in contrast to those of the above-described embodiment. Also, a suitable blade may be equipped adjacent the needle 8 of the sewing machine body 4, whereby a rectangular base blank material can be sewn and cut at one time to create a wavy edge with a seam at its lateral side.

From the above description, it is to be appreciated that the arrangement of three guide rollers 21, 22, 23 and three meander guide grooves 11, 12, 13 with two widened grooves 12a, 13a is effective to move the movable plate 2 such as to perform a sinuous or wavy sewing of the blank material a1.

In particular, the formation of the widened grooves 12a, 13a permits smooth co-active movements of two guide rollers out of the three ones 21, 22, 23 without interference by one of them thereagainst, which assures a smooth and non-interruptive sewing operation. Further, by such reason, the movable plate 2 is positively guided by at least two guide rollers which are slidingly moved along their own guide groove, and therefore, the movable plate 2 is prevented against rattling or wobbling, thus assuring stable movement and precise sewing of the base blank material a1 along a desired wavy line.

Finally, the above description have been made with reference to the embodiment illustrated, but it should be understood that the present invention is not limited to this embodiment and any other various modifications, alterations and additions may structurally be possible without departing from the spirit and scope of the appended claims for the invention. For instance, the guide rollers 21, 22, 23 and guide grooves 11, 12, 13 may be provided at the stationary plate 1 and movable plate 2 respectively, contrary to the above-described embodiment, and the arrangements of those guide rollers and grooves may be altered to other suitable manner insofar as it permits proper movement of the movable plate 2 for creating any kind of sinuous or wavy pattern of sewing path. The same goes for the wavy edge 25a of the movable plate 2. Also, the base blank material a1 is not limited to the one having a sinuously-cut edge a1-1 but may be provided as an ordinary rectangular material, with a view to using the sewing apparatus A as a means for giving a decorative sinuous or wavy seam on such ordinary material.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A sewing apparatus, by which a base blank material is sewn, comprising:

a sewing machine body having a table;

a stationary plate fixed on said table of said sewing machine body; said stationary plate having three guide grooves formed on its upper surface; and a movable plate slidably mounted on said stationary plate, said movable plate including clamp means for securing said base blank material thereon and three guide rollers rotatably provided at a reverse surface of said movable plate, said three guide rollers being adapted to be slidably fitted on said three guide grooves of said stationary plate, respectively, wherein said three guide grooves are each formed in conformity with respective traces which are to be shown by said three guide rollers in order that said movable plate is moved on said stationary plate so as to effect sewing of said base blank material in a sinuous or wavy fashion, and further two of said three guide rollers are each formed with a widened groove whose area is greater than outer diameters of said guide rollers, so that at least two guide rollers are always slidingly moved along their respective guide grooves, to thereby effect stable sewing of said base blank material, whereby, by operation of said sewing machine body, said base blank material is sewn in a sinuous or wavy fashion automatically.

2. The sewing apparatus according to claim 1, wherein one edge of said movable plate is formed in a shape conforming to said sinuous or wavy fashion of sewing that is to be effected on said base blank material, and wherein said base blank material is secured on said movable plate by means of said clamp means such that one end of said base blank material is projected from the one edge of said movable plate.

3. The sewing apparatus according to claim 1, wherein said three guide rollers are arranged at said movable plate such that they are disposed in a spaced-apart relation with one another and each of them is situated adjacent to a respective one of three sides of said movable plate.

4. The sewing apparatus according to claim 1, wherein said widened grooves are each defined at a region of the respective said guide grooves which makes it hard for said guide rollers to move therealong.

5. The sewing apparatus according to claim 1, wherein said widened groove is defined in the respective two guide grooves such that one of said three guide rollers is left idle or free to move therein when at least one of other two rollers of said three guide rollers is moved along an acutely curved region of the corresponding guide groove, to thereby avoid mutual interference of said three guide rollers.

6. The sewing apparatus according to claim 1, wherein said widened groove is defined in the respective two guide grooves such that one of said three guide rollers is left idle or free to move therein when at least one of other two rollers of said three guide rollers is moved in a direction opposite to or different from a direction wherein said one of said three guide rollers is moved, to thereby avoid mutual interference of said three guide rollers.

7. The sewing apparatus according to claim 2, wherein said base blank material comprise a top cover layer, an intermediate pad layer and back layer and further has a sinuously-cut edge at one end thereof, whose contour corresponds to that of said one edge of said movable plate.

* * * * *